United States Patent [19]
Wagner et al.

[11] Patent Number: 5,887,408
[45] Date of Patent: Mar. 30, 1999

[54] CONFIDENTIAL FACSIMILE SYSTEM WITH PRESSURE SEALED SECURITY ENVELOPE

[75] Inventors: David G. Wagner, Amherst, N.Y.; Michael C. Dyer, Lake Zurich, Ill.

[73] Assignee: Moore U.S.A. Inc., Grand Island, N.Y.

[21] Appl. No.: 958,214

[22] Filed: Oct. 27, 1997

Related U.S. Application Data

[62] Division of Ser. No. 749,697, Nov. 15, 1996.

[51] Int. Cl.⁶ .................................................. B65B 61/02
[52] U.S. Cl. ............................. 53/411; 53/447; 53/476; 53/428
[58] Field of Search ............................ 53/411, 428, 447, 53/476

[56] References Cited

U.S. PATENT DOCUMENTS

| | | |
|---|---|---|
| 2,396,833 | 3/1946 | d'Humy . |
| 3,837,565 | 9/1974 | Johnsen . |
| 4,050,582 | 9/1977 | Kalve . |
| 4,095,695 | 6/1978 | Steidinger . |
| 4,239,114 | 12/1980 | Denay . |
| 4,380,315 | 4/1983 | Steidinger . |
| 4,701,233 | 10/1987 | Beck et al. . |
| 4,911,685 | 3/1990 | Anderson . |
| 5,029,429 | 7/1991 | Noma et al. . |
| 5,031,379 | 7/1991 | Lundblad et al. . |
| 5,255,106 | 10/1993 | Castro . |
| 5,360,159 | 11/1994 | Perriman . |
| 5,364,217 | 11/1994 | Bath . |
| 5,397,427 | 3/1995 | Traise et al. . |
| 5,421,779 | 6/1995 | Castro . |
| 5,466,012 | 11/1995 | Puckett et al. . |
| 5,532,293 | 7/1996 | Landis . |
| 5,566,528 | 10/1996 | Lee . |
| 5,690,774 | 11/1997 | Greene . |

FOREIGN PATENT DOCUMENTS

| | | |
|---|---|---|
| 0 378 912 | 7/1990 | European Pat. Off. . |
| 58-142664 | 8/1983 | Japan . |
| WO 93/11948 | 6/1993 | WIPO . |
| WO 96/26599 | 8/1996 | WIPO . |

*Primary Examiner*—Daniel B. Moon
*Attorney, Agent, or Firm*—Nixon & Vanderhye, P.C.

[57] ABSTRACT

A form assembly for enclosing a received facsimile document in an envelope has been developed, along with a method for automatically assembling and sealing the envelope with the facsimile document within. The form assembly includes a front and back sheet that when sealed together form the envelope. The front and back sheets have substantially the same dimensions and are both larger than the received facsimile document. The front and back sheets have a border area adjacent its perimeter, and the border includes a pattern of pressure sealing cohesive. Moreover, the border extends beyond the facsimile document when that document is assembled with the sheets of the envelope. To assemble the form, the facsimile document is sandwiched between the front and back sheets of the envelope. The edges of the assembled form which include the border are compressed with sufficient pressure to activate the cohesive of the border and to thereby seal the envelope closed with the facsimile document within the envelope. Moreover, identifying indicia may be printed on the outside of the envelope to indicate the addressee of the facsimile document.

3 Claims, 3 Drawing Sheets

CONFIDENTIAL FACSIMILE SYSTEM WITH PRESSURE SEALED SECURITY ENVELOPE

This application is a divisional of U.S. application Ser. No. 08/749,697, filed Nov. 15, 1996.

FIELD OF THE INVENTION

The invention relates to the fields of business form assemblies, facsimile printing devices and pressure sealing devices.

BACKGROUND AND SUMMARY OF THE INVENTION

Facsimile ("fax" or "faxing") transmission of documents has in the last ten-years become a favored method of transmission of business documents. Customers fax product order forms with their credit card numbers to all sorts of businesses, such as catalogue retailers and hotels. Lawyers fax documents with privileged and confidential information to other lawyers and their clients. Patients fax their medical history and descriptions of their health problems to their doctors. Accountants fax information regarding accounts, costs and profits to their client businesses. Business people fax documents regarding ongoing negotiations for deals, acquisitions and mergers to other parties engaged in confidential negotiations. Many of the documents sent by facsimile transmission contain confidential information intended to be read only by the addressee of document.

When documents are faxed they are often not sent directly to the addressee, but rather the documents are sent to a facsimile machine in the same office as the addressee, to a location near the addressee or to a location where the addressee is expected to be in the near future. The addressee often does not stand by the facsimile machine as the document is printed from the machine and is often not the person who retrieves the document from the facsimile machine. Facsimile machines are in hotels, convenience stores, business service centers, airport lobbies, government centers, mailrooms of large offices, the receptionist station of small offices, and a wide variety of other locations. Facsimile machines are often located where passersby may read fax documents as the documents print out from the facsimile machine. Moreover, once the faxed document is printed, it is usually temporarily stored where other people who were not intended to read the document can pick up and read the document. A facsimile received in the mailroom of a large office may be read by anyone in the mailroom, and must be at least partially read by the mailroom staff who routes the document to its addressee. Similarly, faxed documents may be read by the hotel staff and by persons checking into a hotel who happen to stand near the facsimile machine. Accordingly, there is a potential for unauthorized persons reading documents received by facsimile when the machine is located where persons, other than the addressee, may read the document as it prints from the machine.

Confidential documents are routinely transmitted by facsimile. The confidentiality of a document as it prints out of a facsimile machine is usually in jeopardy because the document may be read by unauthorized persons as the document is output from the machine. The potential for confidential information being leaked to persons not intended to receive the information is particularly great where the facsimile machine is located in a public or semi-public place, such as in a hotel, business services store, mailroom of a large office, a government center, and in an airport lobby. Accordingly, there has been a long standing need to ensure the confidentiality of faxed documents by preventing unauthorized persons from reading documents being printed from a facsimile machine.

Others systems for preserving the confidentiality of a document printing from a facsimile machine have been proposed and may exist. For example, U.S. Pat. No. 5,255,106 discloses a confidential facsimile machine that applies a cover sheet to a faxed document and seals the cover sheet to each page of the document with adhesive. Similarly, U.S. Pat. No. 5,421,779, discloses a paper pull-tab that reveals a portion of a facsimile document, where the disclosed portion identifies the addressee of the document. U.S. Pat. No. 4,701,233, discloses using a folder and sealing machine to fold each page of a faxed document and seal the folded document. None of these techniques disclose or suggest automatically enclosing an entire received facsimile document in an envelope or sealing the envelope with pressure sealing cohesives.

The present invention relates to a business form assembly for enclosing received facsimile documents in a sealed envelope, and a method for assembling and sealing the envelope and facsimile documents. In a preferred embodiment, the form assembly includes front and back envelope sheets, at least one of which has a border with a pressure sealing cohesive pattern. The pattern of the pressure sealing cohesive is optimized to reduce cohesive costs, reduce the thickness of the sheets due to adhesives and ensure proper sealing of the envelope. For example, the shape and spacing of cohesive spots along horizontal edges of the sheet may be different than those of the spots along the vertical edges due to improved performance of the sheets. Further, each envelope sheet has a center section that is opaque to prevent persons from seeing through the envelope sheets to read documents enclosed in the envelope. The front and back envelope sheets are substantially larger in their length and width dimensions than the dimensions of the sheets of a facsimile document.

A pressure sealing apparatus may be used to arrange the envelope form assembly around a faxed document. The pressure sealing assembly stores front and back envelope sheets in a paper tray or trays. The front and back envelope sheets may be identical and retrieved from one tray. Alternatively, the front and back envelope sheets may be different, such as only one of the front and back sheets includes cohesive, and the front and back sheets are retrieved from different trays. When a faxed document ("fax") is transferred to the pressure sealing device, a front and a back envelope sheet are assembled around the faxed document such that the fax is sandwiched between the envelope sheets. The envelope sheets are substantially larger than the fax, so that a cohesive coated border of at least one of the sheets extends beyond the faxed document. The assembled envelope sheets and faxed document are moved through the pressure sealer to, for example, first seal the left and right sides of the envelope sheets together. Then, the top and bottom edges of the envelope are sealed together to seal the envelope around each of its four sides and secure the faxed document in a sealed, confidential envelope. In addition, a printer associated with the pressure sealing device or facsimile machine may print on the outside of one or both of the envelope sheets the name of the intended addressee of the faxed document.

The sealed envelope is delivered to the intended addressee based on the name and possibly other indicia printed on the outside of the envelope. The envelope sheets may include a perforated strip along one edge to facilitate opening of the envelope by tearing along the strip. Accordingly, the faxed document is sealed in an envelope by the pressure sealing device to prevent a bystander near the facsimile machine from reading the document after it has printed and exited from the facsimile machine.

It is an object of the present invention to provide a confidential facsimile reception system that employs a sealed envelope for faxed documents. It is another object of the present invention to provide a secure envelope formed from flat and unfolded sheets that are relatively inexpensive and easy to handle. A further object of the present invention is to incorporate pressure seal technology to form and seal envelopes around a confidential document, because pressure seal cohesives are not tacky prior to activation and do not require heat or moisture for activation. In addition, pressure seal cohesives may be applied to envelope sheets without concern that the cohesives will activate due to dampness or heat applied to the sheets prior to their assembly as envelopes. There is no concern with contaminating the imaging media or components within the device used to print the variable information on the pressure seal cover sheets. These objects and others are satisfied by the present invention that is described in greater detail in connection with the attached figures.

DETAILED DESCRIPTION OF THE DRAWINGS

Figure 1:
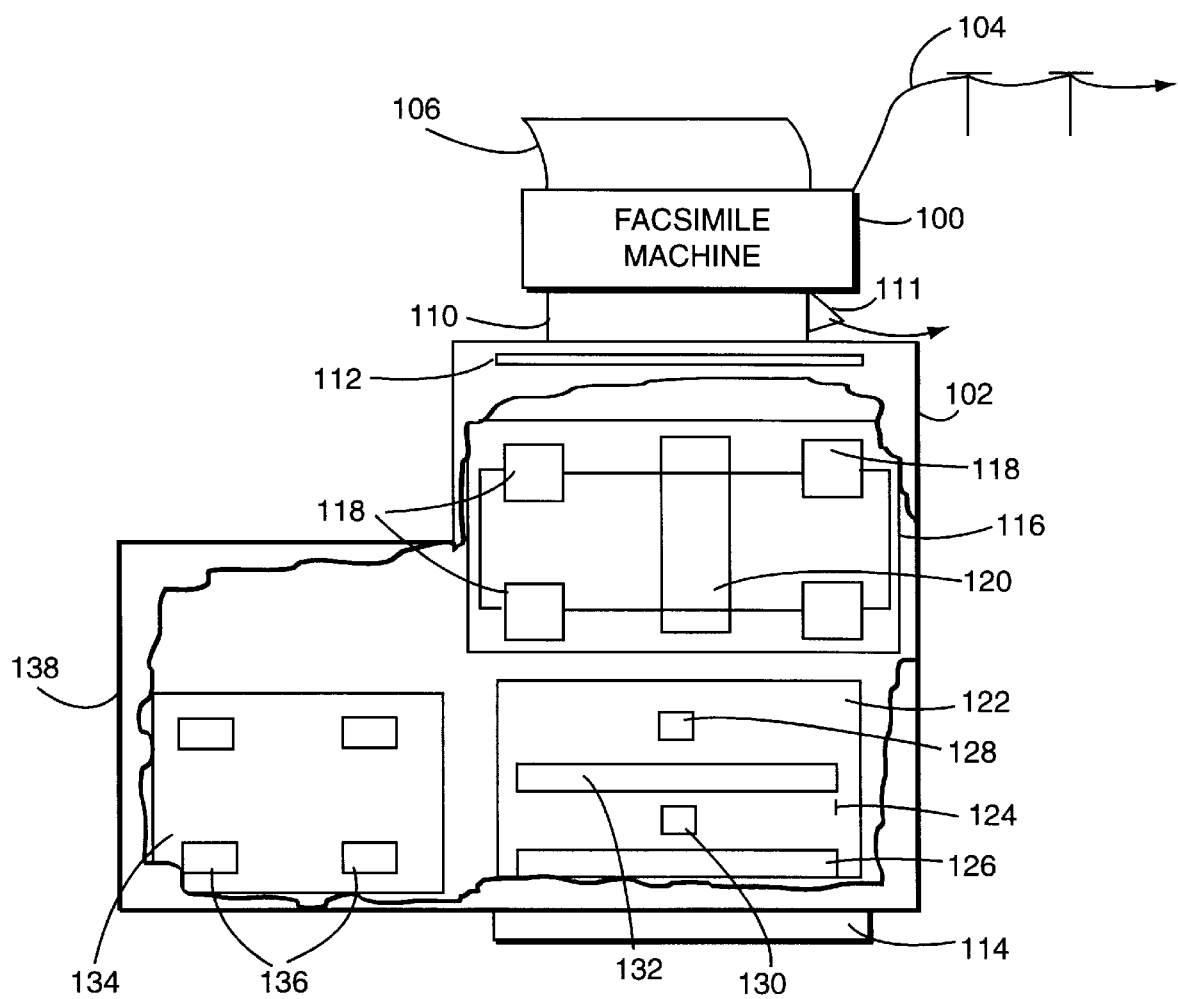
FIG. 1 is a side view of an exemplary facsimile machine with an associated pressure sealing device, in which the device is shown in cut-away to reveal the inner pressure sealing modules.

FIG. 1 shows a facsimile device 100, mounted on a pressure sealing device 102. The facsimile device receives digital data communications including text and/or images defining a faxed document transmitted over a telephone connection 104 with the device. The text and/or images constitute facsimile information to be printed on sheets 106 by the facsimile device. The digital data may also include control messages such as a message indicating that the facsimile transmission is confidential the length of a transmitted page and when the transmission has been completed, and the data may include identifying data such as indicating the addressee of the faxed document. The facsimile machine prints the text and/or images on paper sheets 106 in a conventional manner.

The pressure sealing device receives faxed documents from the facsimile machine. At the output of the facsimile device, where the printed pages of the faxed document flow out of the device, is a chute 110 connecting the facsimile machine to the pressure sealing device. The chute should be designed to prevent bystanders from reading a faxed document as the document moves from the facsimile machine 100 to the pressure sealing device 102. As the facsimile machine prints pages of a faxed document, the printed pages move through the chute and enter the pressure sealing device. A tractor feeder device(s) (not shown) associated with the facsimile machine, chute and/or pressure sealing device may be used to propel the printed faxed pages into the pressure sealing device. The chute 110 may include a switchable door 111 for directing non-confidential faxed documents to a paper tray and directing confidential faxed documents into the pressure sealing device. The door may be switched automatically by a device that receives a control message associated with the faxed document that indicates whether the faxed document is to be confidential.

The pressure sealing device 102 may be of various types, the most suitable device will depend on the particular application and location for the device and facsimile machine. An example of a compact pressure sealing device is a vertical pressure sealing device described in commonly-owned U.S. patent application Ser. No. 08/266,558, filed Jun. 28, 1994 (atty. dkt. No. 263-733) entitled "Vertical Pressure Sealer." Another example of a compact pressure sealing device is described in U.S. Pat. No. 5,397,427. These and other types of pressure sealing devices, such as conventional SPEEDISEAL® pressure sealing equipment, are suitable for the present invention. Each of these pressure sealing devices includes pairs of high-strength rollers that pinch together to apply high compressive forces, e.g. on the order of 200 p.l.i., to sheets of a form assembly passing between the rollers. Typically, around 200 p.l.i. of compressive force is needed to activate a pressure sealing cohesive.

The pressure sealing device 102 is illustrated as a vertical pressure sealing device, but could also be implemented as the horizontal table top pressure sealer shown in U.S. Pat. No. 5,397,427. The pressure sealer includes a faxed document paper input 112 that receives the printed pages of the document. The input collates and temporarily holds the faxed document until the facsimile completes printing of the document and all of the pages of the document have been assembled at the input 112. In addition, front and back envelope sheets are pulled from the paper tray 114. Although only one tray is shown, multiple trays may be used to, for example, stock different sized envelope sheets or to separate front and back sheets. Paper guides (not shown) draw and route the front and back envelope sheets up through the pressure sealing device and arrange the sheets over the front and back of the faxed document at the inlet 112. In an alternative embodiment, up to three sides of the envelope may be sealed as the pair of sheets are moved towards the fax document. If three sides of the sheet pairs are sealed, the faxed document is inserted in the slit formed by the fourth and unsealed edge of the envelope. While the discussion here describes sealing all the envelope edges after the envelope sheets have been assembled around the faxed document, the description is equally applicable to methods in which edges of the envelope are sealed prior to insertion of the faxed document.

Once the sheets have been assembled and the faxed document is sandwiched between the sheets, the assembly of envelope sheets and faxed documents move as an assembly through a first pressure sealing module 116. The first pressure sealing module may include two or four pairs of pressure sealing rollers aligned with the edges of the envelope.

Each pair of rollers 118 in the pressure sealing module applies compressive forces to the envelope sheets as they pass through the rollers. The compressive forces may be on the order of 200 p.l.i., which is sufficient to activate the pressure sealing cohesive arranged in a border area of the envelope sheets. The activation of the cohesive seals two opposing, e.g., left and right, edges of the envelopes. The pairs of rollers 118 are aligned with the envelope assembly to apply compressive forces to the border of the envelope and, specifically, to two opposing strips of pressure sealing cohesive. In addition, the first pressure sealing module may include a pair of opposing rubberized belts 120 that apply a slight compressive force to the form assembly to ensure that the faxed document does not slide out from between the envelope sheet as the form assembly moves through the first pressure sealing module.

After the form assembly has passed through the first pressure sealing module, the partially sealed envelope moves into a chute mechanism 122 that causes the movement of the envelope assembly to shift from vertical to horizontal movement. The chute may be formed of a pair of opposing walls 124 that together form a slot to receive the partially sealed form assembly. At the bottom of the chute may be a ridge 126 that prevents the faxed document from sliding out from between the front and back sheets of the envelope. In addition, the chute may include a sensor switch 128 that detects when the form assembly has dropped into the chute. When the sensor signals that the assembly is fully in the chute, a motor drive (not shown) is turned on to power a roller 130 and/or belt drive 132 to propel the form assembly horizontally into the second pressure sealing module 134.

The second pressure sealing module is similar to the first module in that the second module includes two or four pairs of pressure sealing wheels 136. The sealing wheels of the second module align with the top and bottom border strips, especially with the cohesive strips. As the form assembly passes through the second pressure sealing module, the cohesive of the top and bottom borders is activated by the pressure sealing forces, e.g., 200 p.l.i., applied by the sealing wheels 136. The activation of the cohesive seals the top and bottom edges of the envelope, and thereby completely seals the envelope. The sealed envelope is output from the output end 138 of the pressure sealing device.

The faxed document is not visible when sealed in the envelope. Accordingly, it may be necessary to print the addressee and other identifying indicia on the outside of the envelope. Identifying indicia may be applied to the outside of one or both of the envelope sheets by the facsimile machine 100 or by a printer (not shown) in the pressure sealing device. If the printer in the facsimile machine is to be used to print identifying indicia on the outside of the envelope, then an arrangement must be made to route at least one of the envelope sheets through the facsimile printer.

Figure 2:
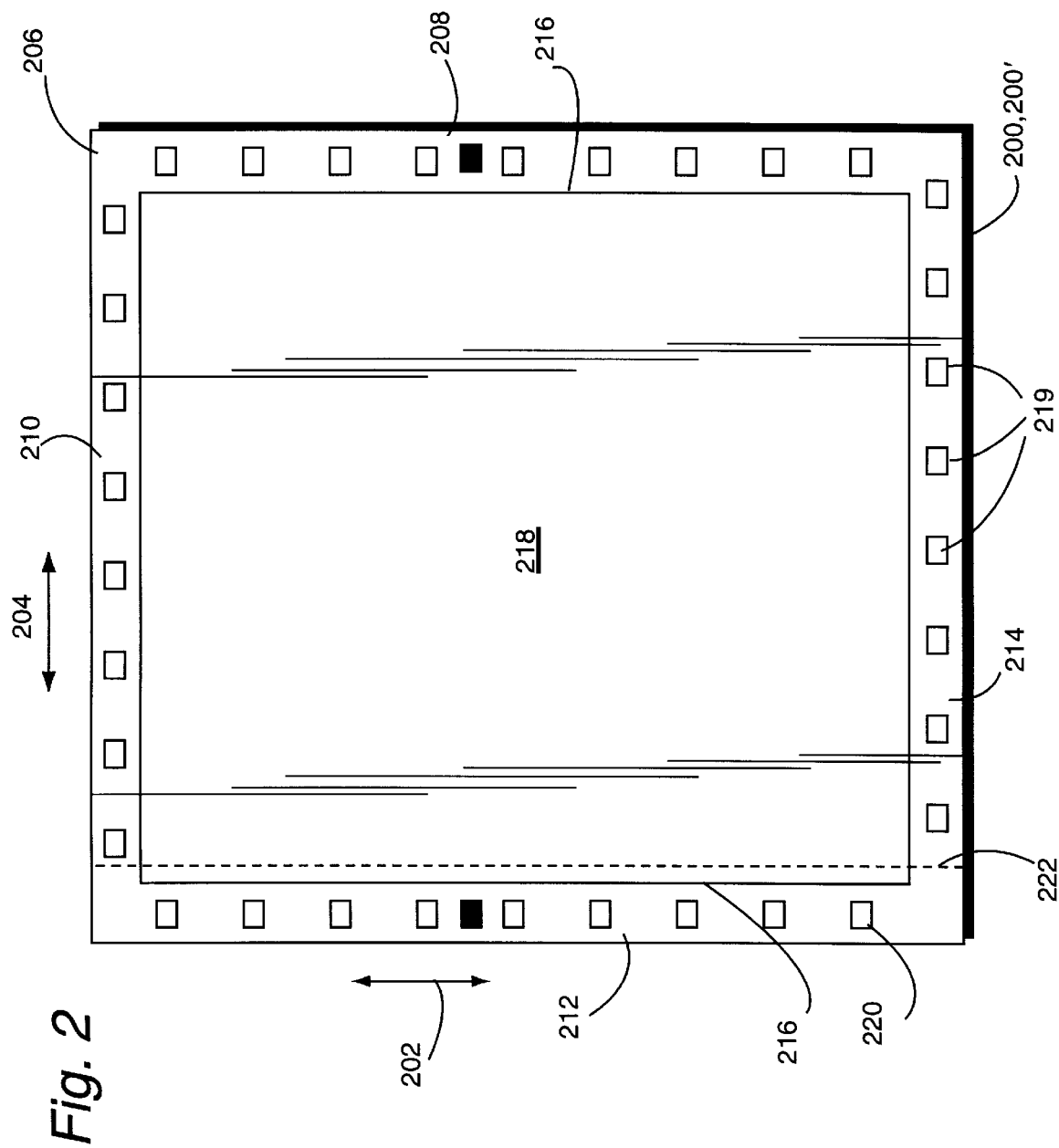
FIG. 2 is plan view of an exemplary envelope cover sheet.

FIG. 2 shows an example of an envelope sheet 200. The outer dimensions of the envelope sheet are substantially larger than the dimensions of the pages of the faxed document. For example, envelope sheets having a length 202 of 13 inches and a width 204 of 9⅞ inches may be used for facsimile document pages having dimensions of 11 inches by 8½ inches. A rectangular border 206 extends around all four sides of the sheet 200. Each strip 208, 210, 212 and 214 of the border extends from an edge of the sheet to the perimeter 216 of a center section 218 of the sheet. The center section 218 of the sheet is larger than the page of a faxed document. For example, the center section may have a length dimension of 12 inches and a width dimension of 8⅞ inches, which is sufficient to overlap a faxed page of 11 inches by 8½ inches and pages in European "A4" format. If the faxed page is legal size (8×14 inches), for example, the envelope sheet must be larger than the exemplary size sheet recited here or reduction of print size may be selected within the imaging device to adjust fax printing to fit an 8½" by 11" sheet size. The center section is opaque so that printed pages cannot be read by looking through the sheet of the center section. The center section may be made opaque by application of a water mark printing that substantially covers the area of the center section, by closely printing repeatedly a corporate logo or other indicia that covers the center section or by other means that obstructs light passing through the sheet 200.

The border 206 of the envelope sheet 200 includes a pattern of pressure sealing cohesive 218. Pressure sealing cohesive is, for example, Moore® TN-124 Pressure Seal Cohesive. Pressure sealing cohesive is activated only by application of high compressive forces; e.g., 200 p.l.i. (pounds per lineal inch). Prior to the application of such compressive forces, pressure sealing cohesives are not tacky, even when exposed to moisture and heat which activate other types of adhesives. Pressure sealing cohesive, prior to activation, may appear as a slightly off-white paint spot on the envelope sheet. Pressure sealing cohesives are advantageous because they do not substantially impair the handling of envelope sheets through the pressure sealing device, and do not stick to handling devices or gum-up components of machinery as do other adhesives.

The particular pattern of the pressure sealing cohesive is selected to ensure secure sealing of the envelope, reduce the tendency of the cohesive to add thickness to the envelope sheet, and minimize the use of the cohesive to reduce cohesive costs. In the disclosed embodiment, the vertical strips 208, 212 of the border 206 are ½ inch wide, and the horizontal strips 210, 214 of the border are ¾ inch wide. The cohesive pattern 218 around the entire border may be formed of spots 220 of cohesive regularly spaced, such as at intervals of between ¾ inch to 1¼ inches along each of the border strips. The spacing of the spots may vary, where, for example, the spacing of spots on the vertical strips is greater than the spacing of spots along the horizontal strips.

The shape of the cohesive spots may be rectangular, circular or other pattern. For example, the cohesive spots along the vertical strips 208, 212 may be rectangles ¼ inch long by ⅜ wide or squares ¼ inch wide. These cohesive spots along the vertical strips may be centered between the edge of the sheet 200 and the perimeter 216 of the center section. Similarly, the cohesive spots along the horizontal strips may be rectangles ½ inch long and ¼ inch wide, or squares ¼ inch wide. The spots on the horizontal strips may also be centered in the strip. By increasing the length of the spots in a direction perpendicular to the nearest edge of the sheet, it is believed that the seal formed by the cohesive is less likely to peel apart. The pattern of cohesive spots is precisely repeated on each sheet, so that the cohesive spots from two facing sheets are aligned, and the spots meet when the pressure sealing wheels compress the form assembly and activate the cohesive. As the two mating spots of opposing sheets pass through the sealing wheels, the cohesive of the spots seals the sheets together at the location of the spots.

A perforated tear line 222 may extend the length 202 of sheet 200 and be located inside of one of the vertical border strips 212. The perforated tear line can be used to open a sealed envelope. The addressee of the envelope grasps a corner of the envelope adjacent the tear line 222 and tears the envelope along that line. In addition, the outside face of one or both of the envelope sheets may receive indicia to identify the addressee. Moreover, preprinted indica may be placed on the outside of each sheet of the envelope to clearly mark the tear line and to boldly state that the envelope contains confidential material.

Figure 3:
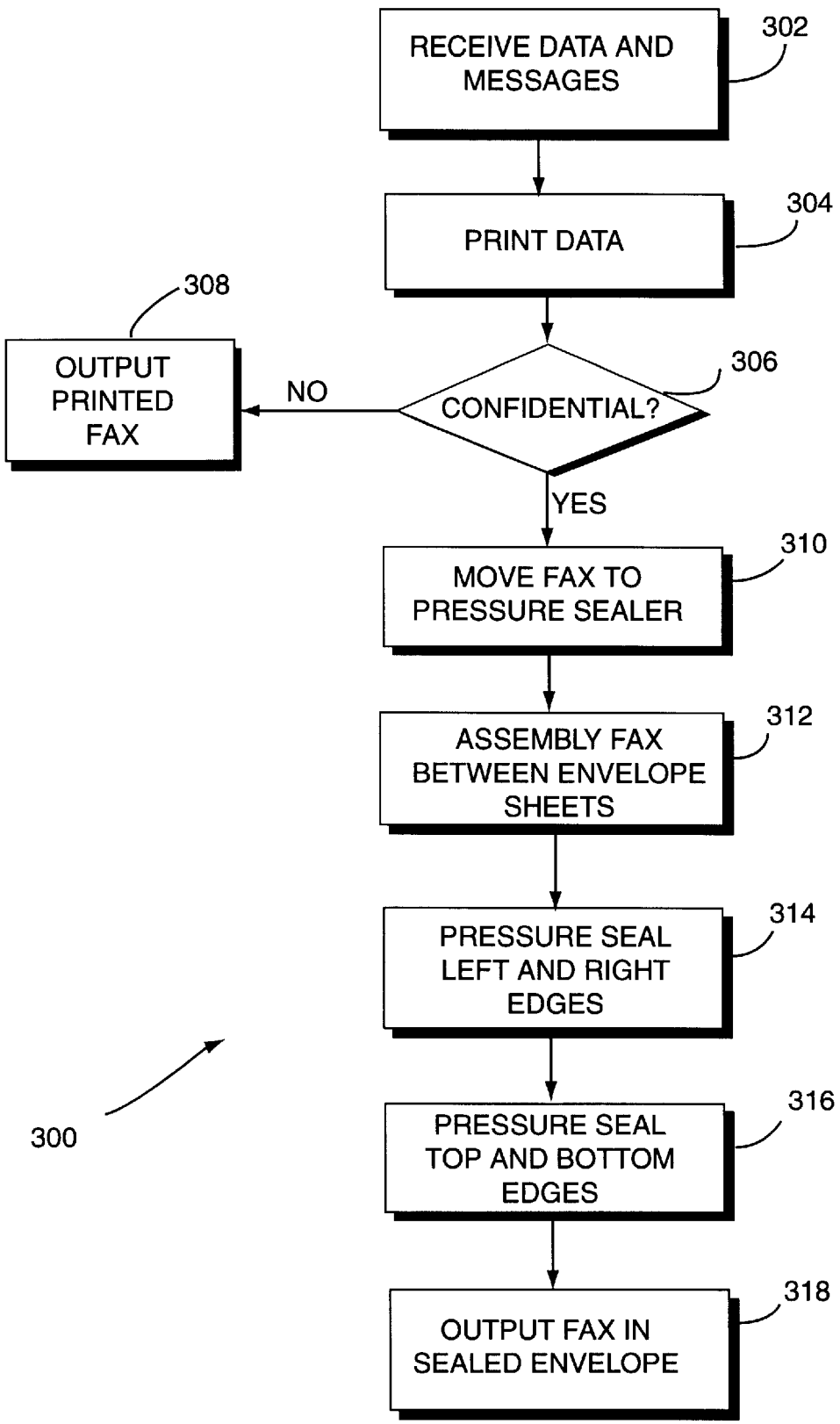
FIG. 3 is block diagram of the method steps for receiving a facsimile transmission, assembling the received facsimile document between envelope cover sheets, applying pressure to activate the pressure sealing cohesive on the envelope cover sheets, and outputting the sealed envelope with enclosed facsimile document.

FIG. 3 shows a flow chart 300 of the steps that may be used to receive a facsimile transmission, print the faxed document and seal the document in an envelope. In step 302, the facsimile machine receives data and control messages of a facsimile transmission. The data may include text and or images that constitute the faxed document. The control messages may indicate whether the document is confidential, the size page of the document being faxed, identifying information, such as the name of the addressee, and signal when the document data has been fully received. In step 304, the facsimile machine prints the data onto the pages of the faxed document. The facsimile machine or pressure sealing device may then determine whether the faxed document is confidential, such as based on the received control messages, in step 306. If the document is not confidential, then the faxed document is output to a paper tray in step 308 and is not enclosed in an envelope.

If the faxed document is confidential, then the faxed document is transferred to the pressure sealing device for assembly with the envelope sheets in step 310. The faxed document is first sandwiched between front and back sheets of the envelope in step 312. Control messages from the facsimile transmission may be transferred to the pressure sealing machine to signal the machine that the faxed document is complete and to indicate the size, e.g., length, of the pages of the faxed document. Using the control messages, the pressure sealing device may determine when to start assembling the envelope around the faxed document and which size envelope sheet is to be used for the faxed document. In steps 314, 316, the edges of the assembled envelope are sealed shut to encase the faxed document in the now-sealed envelope. The faxed document in the sealed envelope is output from the pressure sealing device for delivery to the intended addressee is step 318. In addition, the outside of the envelope receives printed information identifying the addressee either as the envelope sheet passes through the facsimile machine or as the sheet passes through the pressure sealing device.

The invention has been shown and described in what is presently conceived to be its preferred embodiment. Persons of ordinary skill in the art will understand that many modifications and substitutions may be made to the embodiment of the invention disclosed and that those modifications and substitutions fall within the scope of the invention, as defined by the appended claims so as to encompass all equivalent structures and products.

What is claimed is:

1. A method of assembling an envelope around a facsimile document and sealing the envelope comprising the steps of:
   a. receiving a facsimile transmission;
   b. printing the data onto a plurality of pages to generate a faxed document;
   c. collating the faxed document into a stack of the pages;
   d. assembling a front and back envelope sheet around the faxed document such that the document is sandwiched between the sheets, wherein the sheets include a center section and a border;
   e. aligning the faxed documents with a center section of the envelope sheets;
   f. applying a pressure sealing compressive forces to the overlapping borders of the front and back envelope sheets to activate a pattern of pressure sealing cohesives on the front or back envelope sheets or both to both form an envelope and to seal the envelope closed, wherein compressive forces are first applied to a first pair of opposite sides of the envelope sheets by a first arrangement of pressure rollers, and secondly applied to a second pair of opposite sides, orthogonal to the first pair, of the envelope sheets, by a second arrangement of pressure rollers; and
   g. delivering the sealed envelope to its intended addressee.

2. A method of assembling an envelope as in claim 1 further comprising a step of printing indicia on the outside of the envelope identifying the addressee before step (g).

3. A method of assembling an envelope as in claim 1 further comprising a step of determining whether the faxed document is confidential based on control messages received during the facsimile transmission, and performing steps (d) and (e) only if the facsimile is confidential.

* * * * *